United States Patent [19]

Choi

[11] Patent Number: 5,099,371
[45] Date of Patent: Mar. 24, 1992

[54] DEVICE FOR CONTROLLING THE TAPE TENSION OF A TAPE IN A MAGNETIC TAPE RECORDER

[75] Inventor: Kwang-Moon Choi, Suwon, Rep. of Korea

[73] Assignee: SamSung Electronics Co., Ltd., Suwon, Rep. of Korea

[21] Appl. No.: 434,729

[22] Filed: Nov. 13, 1989

[30] Foreign Application Priority Data

May 31, 1989 [KR] Rep. of Korea ............... 89-7426

[51] Int. Cl.$^5$ ............... G11B 15/43; G11B 15/32; G11B 5/08
[52] U.S. Cl. ............... 360/96.1; 360/74.3; 242/75.43; 242/189
[58] Field of Search ............... 360/96.1, 85, 95, 90, 360/84, 83, 93, 74.3; 242/156, 150 M, 150 R, 149, 147 R, 193, 194, 199, 75, 75.43, 189

[56] References Cited

U.S. PATENT DOCUMENTS

| 3,965,483 | 6/1976 | Katoh et al. | 360/90 |
|---|---|---|---|
| 3,969,766 | 7/1976 | Tanaka et al. | 360/85 |
| 4,350,454 | 9/1982 | Schoenlein | 242/156 |
| 4,562,496 | 12/1985 | Saito et al. | 360/85 |
| 4,614,315 | 9/1986 | Gerrits et al. | 360/85 |
| 4,635,146 | 1/1987 | Koda et al. | 360/85 |
| 4,636,887 | 1/1987 | Kato et al. | 360/85 |
| 4,672,476 | 6/1987 | Saito et al. | 360/85 |
| 4,751,592 | 6/1988 | Hütter et al. | 360/85 |

Primary Examiner—John H. Wolff
Assistant Examiner—Craig A. Renner
Attorney, Agent, or Firm—Robert E. Bushnell

[57] ABSTRACT

A tension controller of a tape recorder maintains a constant tension in a running tape in the tape recorder. One embodiment includes a friction element for generating frictional force on one side of a tape reel disk, a tension controller for controlling the tension of the tape in which the tension controller is resiliently contacted by means of a spring in an upper face of the friction element, a slant cam formed at the edge of the contacted surface, and a tension pole formed in the upper direction on one side of a tension arm. A lifter minimizes the frictional action on the tape by being connected to a moving lever formed on the lower side of the tension controller and raising the tension during controller high-speed searching. Automatic control of the infinitesimal tension of the tape and prevention of interference in the tape during high-speed searching may be attained. The deck can be compact and the number of parts for the fabrication can be reduced to a simple structure, thereby providing many advantages in the fabrication process.

14 Claims, 3 Drawing Sheets

DEVICE FOR CONTROLLING THE TAPE TENSION OF A TAPE IN A MAGNETIC TAPE RECORDER

BACKGROUND OF THE INVENTION

This invention relates to a tension controller for tape recorders which constantly maintains the tension of running tape in the tape recorder.

Generally, the tape recorders can record or reproduce data in the tapes by moving the tape according to the specified running course after holding the tape at both of the reel disks established on the deck. At this time, an excessive tension or sag occurs due to running characteristics. Thus, the apparatus for maintaining a constant tension in the tape is needed in order to prevent this phenomenon. For the past in order to maintain a constant tension in the running tape, a band brake has been established at one side of the reel disks of tape recorders. By driving this brake, the braking of a reel disk and reduction of speed is carried out, although this requires a complex structure. That is, the tension arm connected to the band brake, the tension lever, plate for supporting said tension arm and spring, etc, must be set up.

Thus, a tension arm or relatively large volume is established for driving inside the tape on loading and unloading, so that the driving distance becomes larger, making the occupied space wider. This causes not only a disadvantage of device compactness but also many processes for production due to an assembly of many independent parts. In addition, in order to control a infinitesimal tension, the separate complex apparatus is needed. But, this is difficult for practical use since the cost rises and the size increases. Thus, the infinitesimal tension control for the tape can't be achieved.

SUMMARY OF THE INVENTION

The present invention has been made in consideration of this and has for its object to provide a tension controller for the tape recorders, in which the tension controller is resiliently established at the reel disk, the friction element between these is made so that the tension is controlled by a friction force.

Another object of this invention is to provide a tension controller for minimizing the acting friction on the tape during high-speed searching for necessary parts of the recorded signal.

According to the present invention including a head drum and real disks on the deck, there is provided a tension controller including a friction element for generating the frictional force at one side of the reel disks, a tension control element for controlling the tension of the tape in which the tension control element is resiliently contacted by means of a spring in an upper face of said friction element, a slant cam formed at the edge of the contact surface and a tension pole formed on the upper direction in one side of a tension arm, and lifter for minizing the friction action on the tape by being connected to a moving lever formed at the lower side of the tension control means and raising said tension control means during high-speed searching.

DETAILED DESCRIPTION OF THE INVENTION

The present invention will be now described in more detail with reference to accompanying drawings.

Figure 1:
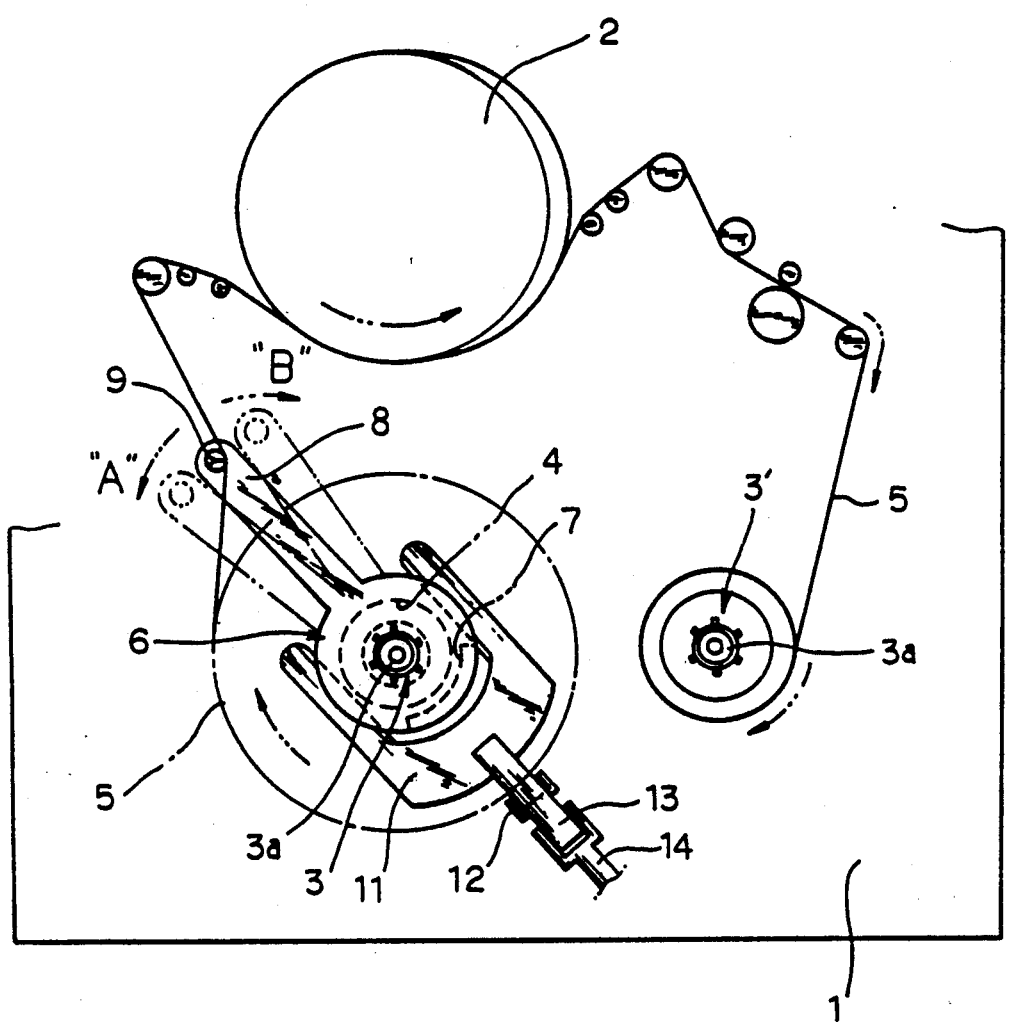
FIG. 1 is a schematic plan view of the overall composition of the present invention.
Figure 2:
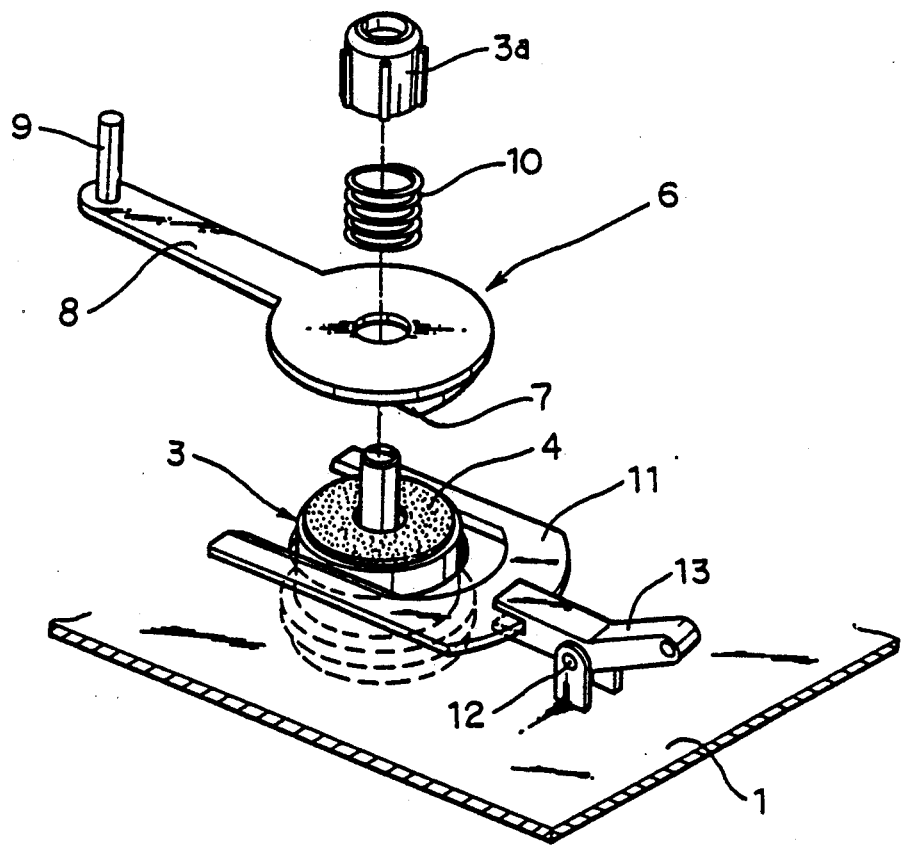
FIG. 2 is an exploded perspective view of the major part of the present invention.
Figure 3:
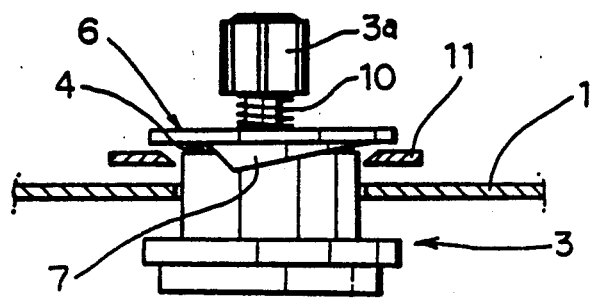
FIG. 3 is a cross-sectional view of the assembly of FIG. 2.
Figure 4:
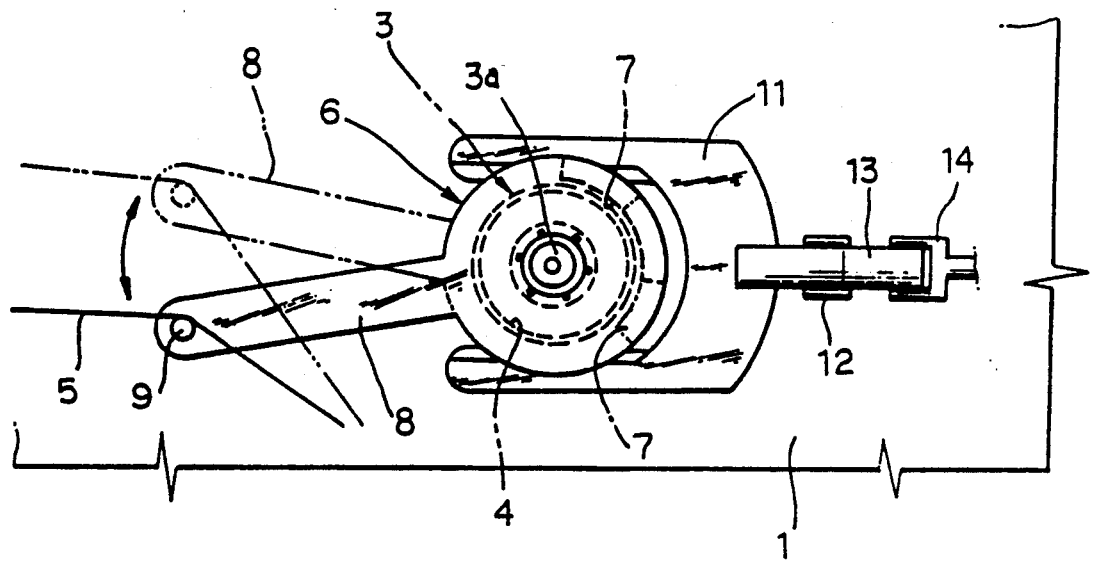
FIG. 4 is a plan view representing the operation of the present invention.

FIG. 1 shows a schematic overall diagram of the tape recorder with the tension controller. As mentioned before, a head drum 2 and reel disks 3, 3' for holding tape and established separately on a deck 1 and the tape is moved along the running course, being contacted to the head drum 2. As the present invention shown in FIG. 2, a friction means 4 such as a felt are fixedly set up at the reel disk 3.

The tension control element 6 is coaxially established on the upper side of the friction element 4 to control the tension of the tape 5.

This tension element 6 is constructed so that a slant cam 7 is formed at the edge of a contact surface with the friction element 4 and a tension pole 9 is formed on the upper direction of a tension arm 8 and is contacted with the tape 5.

Also, an elastic spring 10 is inserted between the tension control element 6 and a reel hub 3a to apply the force downward, thereby acting the frictional force between the lower side of the tension control element 6 and the friction element 4.

On the other hand, a lifter element 11 is established at the lower side of the tension control element 6 in order to minimize the friction action when high-speed search is carried out for searching the necessary parts of the recorded signal on the tape.

The lifter element 11 is constructed so that a pair of protrusions (arms or lugs) of the lifter 11 at the lower side of the tension control element 6 is connected to one side of a moving lever 13 set up at the deck 1 and the other side of the moving lever 13 is also connected to a high-speed searching button 14.

The slant cam 7 formed at the lower side of the tension control element is located at the upper side of the lifter 11 in order to be slipped or break away along the upper face of the lifter 11.

The operation of the present invention will now be described.

Generally, if the play button ON after holding the cassette tape at both of reel disks 3 and 3' established on the deck 1, the tape is loaded between the head drum 2 by the tape loading element (not shown in figures) established inside the deck 1 and is run according to the constant running course. At this time the tension occurs in the tape so that A-directional force toward the outside of the tape 5 is applied. B-directional force toward the inside of the tape 5 is applied by the frictional force of the friction element 4 according to the rotation of the reel disk 3 so that the tape 5 is hung on the tension pole 9, so B-directional force is applied. Thus, the tension of the tape 5 can be maintained constantly.

To explain in more detail, when the supply reel disk 3 is rotated faster due to inertia force than the take-up reel disk 3' on the normal running with the constant tension, the sag of the tape occurs since the loosing speed of the supply reel disk 3 is faster than the winding speed of the take-up reel disk 3'.

At this time the tension control element 6 at the reel disk 3 is compressed by the elastic spring 10 and also has a rotating force toward the rotation direction of the reel disk 3, that is, the B-directional force of the tape in FIG. 1, by the compression force of the friction element between the reel disk 3 and the tension control element 6. Thus, the tape 5 hung on the tension pole 9 of the tension control element 6 moves toward B-direction and then has the tension.

Also, when the tension control element 6 moves toward B-direction, the slant cam 7 formed on the outside of the lower side of the tension control element 6 descends slightly by being guided toward the upper side of the lifter 11.

Figure 5:
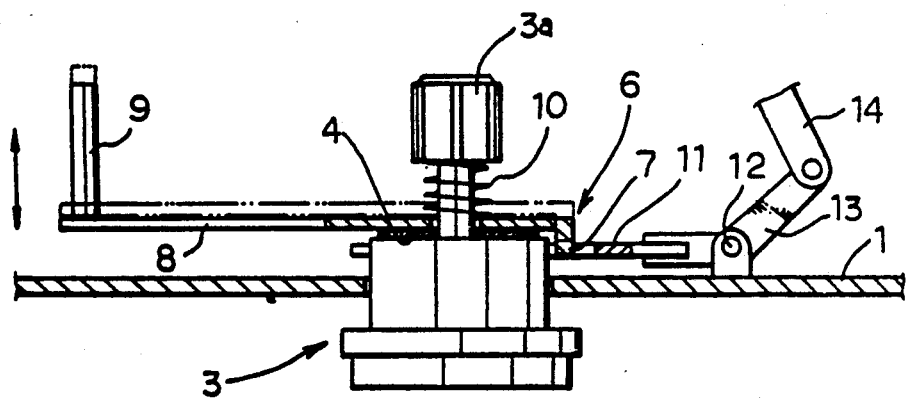
FIG. 5 is a cross-sectional view representing the operation of FIG. 4.

According to the slight descent of the slant cam 7, the lower side of the center of the tension control element 6 is compressed to the friction control element 4 on the upper side of the reel disk 3 as the solid line in FIG. 5 shows, also more compressed by the elastic force of the spring 10 formed on the tension control element 6.

Consequently, the barking force is applied on the supply reel disk 3 so that the rotation speed of the supply reel disk 3 decreases and the tension of the tape 5 increases since the rotation speed of the supply reel disk 3 becomes smaller than that of the take-up reel disk 3'.

Next, if the tension increases, the tension of the tape 5 hung on the tension pole 9 of the tension control element 6 becomes greater than supply reel disk 3, tension control element 6 has the reverse rotation force. The slip phenomenon occurs at the friction element 4 established between the reel disk 3 and the tension control element 6, and the tension control element 6 pauses.

At the same time, the tension control element 6 rotates reversaly by the tension of the tape 5 and the tension pole 9 moves rotationally toward A-direction as the reverse direction of the B-direction in FIG. 1.

In addition, as the tension control element rotates reversely the slant cam 7 rises again toward the upper side of the lifter 11 by being guided slightly. Thus, the tension control element 6 is separated from the friction element 4 between the reel disk 3 and the tension control element 6, there the compressing force occurs, as a false line shown in FIG. 5 so that the compressing force due to the friction element reduces. The rotating speed of the reel disk 3 increases again, thereby reducing the tension of the tape 5.

As mentioned above, the reason for increasing and supporting the tension of the tape 5 is for reproducing successfully the recorded signal in the tape 5. The reason for reducing the increased tension of the tape 5 is for preventing the extension of the tape 5 due to the excessive tension.

On the other hand, when the slant cam 7 is guided and held to the upper side of the lifter 11, the friction element 4 and the tension control element 6 must be separated. At this time, there may be some questions about the operating principle that the lifter 11 moves and falls centering around a hinge 12 and the tension control element 6 is then separated from the friction element 4, but it is supported by the high-speed searching buttom 14 established at the moving lever piece 13 (not shown in Figures) so that such problems do not occur.

Figure 6:
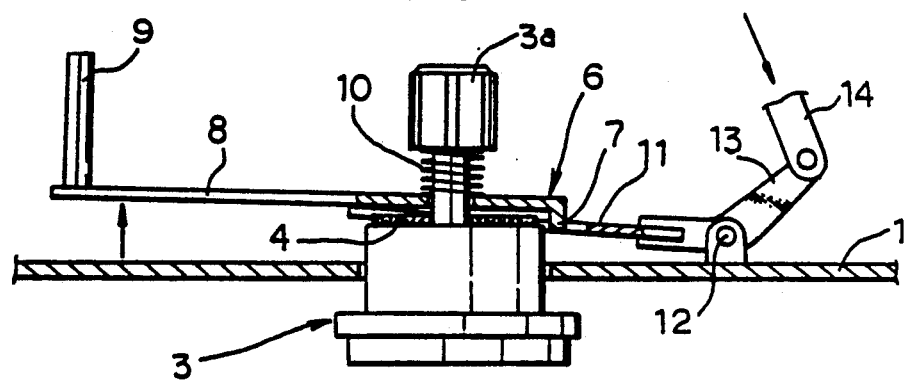
FIG. 6 is a cross-sectional view representing the operation when high-speed search.

Next, the high-speed is needed for searching the necessary parts of the recorded signal in the tape 5 and its operating principle will be described with reference to FIG. 6.

First, on acting the high-speed searching button 14, the moving lever piece 13 than moves centering around the hinge 12 and the lifter 11 connected to the moving lever piece 13 pushes and supports the tension control element 6 upward. Thus, the tension control element 6 can be separated the friction element 4 so that the tension control operation is not carried out.

As this, the reason for not carrying out the tension control operation is due to the fact that the strong tension occurs at the tape 5 on high-speed searching and the high-speed running is difficult to achieve by interfering with the tape 5 when operating the tension control element 6.

Although the tape 5 is hung on the tension pole 9 of the separated tension control element 6 from the friction element 4 can the tension occurs, it is minute enough to be negligible on high-speed search as the interference in the tape 5.

As mentioned before, the present invention controls automatically the infinitesimal tension of the tape 5 by composing of the tension control element 6 and the friction element 4 at the reel disk 3, also prevents the interference in the tape 5 by the simple lifter apparatus on high-speed searching. In addition, when loading and unloading, the operation space is small and the tension control operation acts with neighboring an exit of the tape 5 of the reel disk 3. Thus, the deck 1 can be compact and the number of the parts for the fabrication can be reduced due to the simple structure, thereby creating several advantages in the process.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A tension controller of a tape recorder comprising:
    friction means for generating frictional force on one side of one of a pair of reel disks,
    a spring,
    tension control means for controlling tension of sections of tape disposed between the reel disks, said tension control means being subjected to a bias provided by said spring toward said friction means,
    a slant cam formed at an edge of a first surface of said tension control means,
    a tension pole, disposed to engage the sections of the tape disposed between the reel disks, formed on a second surface of and on one end of a tension arm of said tension control means, and
    lifter means, for minimizing said frictional force on said one of said pair of reel disks, said lifter means being placed below the first surface of said tension control means for moving said tension control means toward said spring during high-speed searching of the tape.

2. The tension controller as claimed in claim 1, wherein said slant cam contacts said lifter means as tape tension increases, thereby raising said tension control means toward said spring to reduce frictional contact between said friction means and said tension control means.

3. A tension controller of a tape in a tape recorder, comprising:
- a reel disk provided with a frictional member at a surface of said reel disk;
- lifter means having a pair of operating lugs, said lifter means being pivotally mounted at one side of said reel disk by a lifting member having a moving lever and a hinge;
- said reel disk being disposed between both operating lugs of said lifter means; and
- tension control means mounted on a surface of said frictional member and above said lifter means and rotated by tension of the tape whereby said reel disk is controlled in response to the tension of the tape.

4. The tension controller as claimed in claim 3, wherein said tension control means is provided with a slant cam.

5. The tension controller as claimed in claim 4, wherein said frictional member is a disk composed of felt.

6. The tension controller as claimed in claim 4, wherein said slant cam contacts said lifter means as tape tension increases, thereby raising said tension control means to reduce frictional contact between said frictional member and said tension control means.

7. The tension controller as claimed in claim 6, further comprising:
- a spring, wherein said tension control means controls tension of sections of the tape disposed between said reel disk and another reel disk, said tension control means being subjected to pressure provided by said spring toward a face of said frictional member;
- said slant cam being formed at an edge of a first surface of said tension control means; and
- a tension pole, disposed to engage the sections of the tape disposed between the reel disks, formed on one end of a tension arm of said tension control means.

8. A tape tension controller of a recorder having a pair of reel disks, comprising:
- friction means contacting a flat surface of one of said reel disks;
- tension control means having a tension arm with a disk shaped end, an elongated section and a rounded-over end, wherein said disk shaped end has a slant cam connected to a first surface at an edge away from the elongated section, and wherein said friction means contacts said first surface;
- a tension pole, connected to a second surface of said tension arm at said rounded-over end, for contacting a tape and for lessening tension in said tape or applying tension to said tape as a result of friction between said tension control means and said friction means;
- a compression spring, connected between said second surface of said tension arm at said disk shaped end and a hub, for applying pressure to said tension arm to ensure contact between said tension control means and said friction means; and
- lifting means having a lifter mounted beneath said tension control means at said disk shaped end of said tension arm, a hinge and a lever, wherein said lever lifts said lifter to raise said tension control means thereby removing any friction between said friction means and said tension control means when it is desired for said tape to move at a high speed.

9. The tape tension controller of a recorder as set forth in claim 8, wherein said slant cam contacts said lifter as tape tension increases beyond an ideal tension thereby raising said tension arm to promote less frictional contact with said friction means; and
wherein said slant cam does not contact said lifter when said tension in said tape is ideal.

10. The tape tension controller of a recorder as set forth in claim 9, wherein said lifter has an U-shaped groove and wherein said groove has a slanted edge where said slant cam and said lifter come in contact.

11. The tape tension controller of a recorder as set forth in claim 10, wherein said lever is connected to a high speed search button of said recorder and is pivotally connected to said hinge so that as said lever is lowered by said high speed button said lifter raises said tension control means.

12. The tape tension controller of a recorder as set forth in claim 9, wherein said slant cam increasingly lifts said tension arm as said tension in said tape increases.

13. The tape tension controller of a recorder as set forth in claim 10, wherein said slant cam increasingly lifts said tension arm as said tension in said tape increases.

14. The tape tension controller of a recorder as set forth in claim 8, wherein said friction means is a disk composed of felt.

* * * * *

UNITED STATES PATENT AND TRADEMARK OFFICE
CERTIFICATE OF CORRECTION

PATENT NO. : 5,099,371
DATED : 24 March 1992
INVENTOR(S) : Kwang-Moon CHOI

It is certified that error appears in the above-identified patent and that said Letters Patent is hereby corrected as shown below:

Column 1, Line 61, replace "minizing" with --minimizing--;

Column 3, Line 38, replace "reversaly" with --reversely--;

Column 4, Line 6, replace "than" with --then--;

Line 20, replace "can" with --and--.

Signed and Sealed this

Eighteenth Day of May, 1993

Attest:

MICHAEL K. KIRK

Attesting Officer     Acting Commissioner of Patents and Trademarks